US011841351B2

(12) United States Patent
Kudo (10) Patent No.: US 11,841,351 B2
(45) Date of Patent: Dec. 12, 2023

(54) SAMPLE ANALYSIS APPARATUS (71) Applicant: SHIMADZU CORPORATION, Kyoto (JP)

(72) Inventor: Yukihiko Kudo, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 972 days.

(21) Appl. No.: 16/606,517

(22) PCT Filed: Apr. 25, 2017

(86) PCT No.: PCT/JP2017/016417
§ 371 (c)(1),
(2) Date: Oct. 18, 2019

(87) PCT Pub. No.: WO2018/198207
PCT Pub. Date: Nov. 1, 2018

(65) Prior Publication Data
US 2021/0116429 A1    Apr. 22, 2021

(51) Int. Cl.
*G01N 37/00* (2006.01)
*G01N 30/72* (2006.01)
(Continued)

(52) U.S. Cl.
CPC ........... *G01N 30/72* (2013.01); *G01N 27/623* (2021.01); *G01N 30/28* (2013.01); *G01N 37/00* (2013.01);
(Continued)

(58) Field of Classification Search
CPC ..................................................... G01N 37/00
See application file for complete search history.

(56) References Cited

U.S. PATENT DOCUMENTS 4,793,357 A * 12/1988 Lindstrom ............. A61B 6/507
600/431

OTHER PUBLICATIONS

Mohamad T., Limit of Blank (LOB), Limit of Detection (LOD), and Limit of Quantification (LOQ), 2018, Organic & Medicinal Chem IJ. pp. 1-5 (Year: 2018).*

(Continued)

*Primary Examiner* — Jamel E Williams
*Assistant Examiner* — Alex T Devito
(74) *Attorney, Agent, or Firm* — Sughrue Mion, PLLC (57) ABSTRACT

A response factor that is a signal strength ratio with respect to a reference compound for various compounds is previously stored in a response factor storage (22). When an operator instructs to estimate an analysis limit value, a measurement unit (1) performs GC-MS analysis on a sample containing the reference compound a plurality of times under control of an analysis controller (3). A signal strength calculator (23) obtains a signal strength value of the reference compound based on an analysis result of the measurement unit (1), a relative strength calculator (24) calculates a relative standard deviation from the plurality of measured signal strength values, and calculates the relative standard deviation of a target compound from the response factor of the target compound read from the response factor storage (22). An analysis limit value estimator (25) estimates a limit of detection (LOD) and the like from the relative standard deviation of the target compound by a known method, and displays the LOD on a display (6). Consequently, the analysis limit value can simply be obtained without actually measuring the target compound.

18 Claims, 4 Drawing Sheets

(51) Int. Cl.
  *G01N 30/28* (2006.01)
  *G01N 27/623* (2021.01)
  *G01N 30/02* (2006.01)
(52) U.S. Cl.
  CPC . *G01N 2030/025* (2013.01); *G01N 2030/027* (2013.01)

(56) References Cited

OTHER PUBLICATIONS

About QA-QC operation Q: How to calculate method detection limit (MDL), detection limit (DL), quantitation limit (QL) (Inquiry No. 0906), [online], 21 pages, Shimadzu Corporation [searched Dec. 20, 2016], Internet <URL: http://www.an.shimadzu.co.jp/gcms/support/faq/gcmssol/faq9.htm#0906>.

"Signal, noise, and limit of detection in mass spectrometry", [online], Agilent Technologies, Inc., [search on Dec. 20, 2016], 16 pages, Internet <URL: http://www.chem-agilent.com/pdf/low_5990-7651JP.pdf>.

"Ion chromatograph Q & A No. 4 How to obtain detection limit and quantitation limit values", Dionex Technical Review (Dionex Technical Review), 12 pages, Nippon Dionex, Inc. TR015YS-0083, [2009].

Michihisa Uemoto, "Concepts and definitions of the limit of detection and the limit of quantitation", Japan Society for Analytical Chemistry, 2010, pp. 217-221, No. 5.

Dobashi Hitoshi, "Automatic identification and semi25 quantitative analysis of serum psychotropic drugs using GC/MS method toxicological database", [online], Shimadzu Corporation, [Dec. 2016], 6 pages, Internet <URL: http://www.an.shimadzu.co.jp/gcms/support/lib/pdf/c146-0279.pdf>.

Philip R. Bevington, "Data Reduction and Error Analysis for the Physical Sciences", [online], Cornell University, USA [searched Dec. 20, 2016], 338 pages, Internet <URL: http://astro.cornell.edu/academics/courses/astro3310/Books/Bevington_opt.pdf>.

International Search Report for PCT/JP2017/016417 dated Jul. 18, 2017 [PCT/ISA/210].

Written Opinion for PCT/JP2017/016417 dated Jul. 18, 2017 [PCT/ISA/237].

Liu Zhi-Bin et al., "Determination of toxaphene in food by isotope dilution high resolution gas chromatography/high resolution mass spectrometry", Journal of Food Safety and Quality, vol. 5, No. 2, pp. 475-484, Feb. 2014 (18 pages total).

Li Hai et al., "Detection limit and interval distribution of laboratory analysis results, Textile Standards and Quality", No. 5, Oct. 2017, pp. 39-42 (8 pages total).

Communication dated Jul. 29, 2021 from the China National Intellectual Property Administration in CN Application No. 201780090077.4.

Decision of Rejection dated Feb. 14, 2022 from the China National Intellectual Property Administration in Chinese Application No. 201780090077.4.

\* cited by examiner

SAMPLE ANALYSIS APPARATUS

CROSS REFERENCE TO RELATED APPLICATIONS

This application is a National Stage of International Application No. PCT/JP2017/016417, filed on Apr. 25, 2017.

TECHNICAL FIELD

The present invention relates to various sample analysis apparatuses, such as a mass spectrometer, a gas chromatograph (GC), a liquid chromatographs (LC) and an X-ray fluorescence spectrometer, which analyze a compound or an element in a sample, and more particularly to a sample analysis apparatus having a function of calculating a limit of detection, a limit of quantitation and the like, and of presenting the calculation result to a user.

BACKGROUND ART

When the sample is analyzed using various sample analysis apparatuses including a mass spectrometer, it is necessary to grasp a limit of detection (LOD) and a limit of quantitation (LOQ) in order to secure measurement reliability.

For example, Non Patent Literature 1 discloses a gas chromatograph mass spectrometer (GC-MS) that calculates and displays the LOD and the LOQ for a target compound when an operator inputs a kind of the target compound and other necessary parameters. Several methods as described below are conventionally known as a method for calculating the LOD and the LOQ of the target compound in the sample analysis apparatuses (see Non Patent Literatures 1 to 4).

Method A

A plurality of standard samples containing a target compound having a concentration of about 3 to 5 times the expected LOD are prepared, and the plurality of standard samples are analyzed by the sample analysis apparatus to obtain a plurality of signal strength values (in chromatography, a peak height value or a peak area value). The detection limit value $P_{LOD}$ for the target compound is calculated from the following equation (1) using the plurality of signal strength values.

$$P_{LOD}=(\sigma/S_{av})\times C\times t(n-1,\alpha) \tag{1}$$

Where $\sigma$ and $S_{av}$ are the standard deviation and the average value of the plurality of signal strength values, thus $\sigma/S_{av}$ is a relative standard deviation (RSD) representing reproducibility of repeated analysis, and C is concentration of the standard sample. Also, $t(n-1, \alpha)$ is a value of a t-test under a degree of freedom (in this case, the number of analysis times) $n-1$ and a confidence interval of $100\times(1-\alpha)\%$ ($\alpha$ is an appropriately-decided population standard deviation, for example, 0.05).

A quantitation limit value $P_{LOQ}$ for the target compound is calculated by the following equation (2) using the above detection limit value $P_{LOD}$.

$$P_{LOQ}\beta\times P_{LOD} \tag{2}$$

Where $\beta$ is an appropriate coefficient determined empirically, and generally has a value of 3 or more usually, about 3 to 3.3).

Method B

In method B, the LOD and the LOQ for the target compound are calculated using a calibration curve of the target compound prepared by an external standard method or an internal standard method.

That is, a plurality of standard samples having different concentrations of the target compound are prepared, and analysis is performed by the external standard method or the internal standard method to prepare the calibration curve. The detection limit value $P_{LOD}$ and a quantitation limit value $P_{LOQ}$ for the target compound are calculated by the following equations (3) and (4) from the signal strength values (hereinafter, referred to as a "blank signal values") obtained by analyzing a blank sample in which no target compound is contained a plurality of times using a sample analysis apparatus, and the standard deviation of the blank signal values.

$$P_{LOD}=f(S_0+S_B\times\gamma) \tag{3}$$

$$P_{LOQ}=f(S_0+S_B\times\delta) \tag{4}$$

Where f(S) is a function of the concentration value with respect to a signal strength value S, namely, the calibration curve of the target compound. $S_0$ is the average value of the blank signal values, $S_B$ is the standard deviation of the blank signal values, $\gamma$ is a coefficient usually set at about 3 to 3.3, and $\delta$ a coefficient usually set at about 10 (or about 3 times $\gamma$).

Another method is also used in which the standard deviation of the blank signal value is replaced with the standard deviation of the residuals of the calibration curve, the residual standard deviation of a y-intercept of the calibration curve, or a noise level.

Method C

A series of standard samples (dilution series) containing different concentrations of a target compound is prepared, and analyzed by the sample analysis apparatus to obtain respective signal strength values. The lowest concentration at which the SN ratio of the acquired signals is greater than or equal to a predetermined threshold or at which the relative standard deviation is less than or equal to a predetermined threshold is defined as the detection limit value $P_{LOD}$. There is another method for determining the detection limit value $P_{LOD}$ without preparing the dilution series in which the value of noise N is obtained by measuring the blank sample, and the concentration at which the SN ratio becomes a predetermined threshold value is calculated based on the signal strength value obtained by measuring a standard sample having a specific concentration, and the concentration at which the SN ratio becomes the predetermined threshold is as the detection limit value $P_{LOD}$.

CITATION LIST

Non Patent Literature

Non Patent Literature 1: "About QA-QC operation Q: How to calculate method detection limit (MDL), detection limit (DL), quantitation limit (QL) (Inquiry No. 0906), [online], Inc. Shimadzu Corporation [searched Dec. 20, 2016], Internet Non Patent Literature 2: "Signal, noise, and limit of detection in mass spectrometry", [online], Agilent Technologies, Inc., [search on Dec. 20, 2016], Internet Non Patent Literature 3: "Ion chromatograph Q & A No. 4 How to obtain detection limit and quantitation limit values", Dionex Technical Review (DIONEX TECHNICAL REVIEW), Nippon Dionex, Inc. TR015YS-0083

Non Patent Literature 4: Uemoto Michihisa, "Concepts and definitions of the limit of detection and the limit of quantitation", Japan Society for Analytical Chemistry, Bunseki, 2010, No. 5, pp. 217-221

Non Patent Literature 5: Hitoshi Dobashi, "Automatic identification and semi- quantitative analysis of serum psychotropic drugs using "GC/MS method toxicological database"", [online], Shimadzu Corporation, [2016 Dec. ] Search 20 days], Internet Non Patent Literature 6: PR Bevington (Bevington), 1 person, "Data Reduction and Error Analysis for the Physical Sciences", [online], Cornell University, USA [searched Dec. 20, 2016], Internet

SUMMARY OF INVENTION

Technical Problem

In the methods A and C, it is necessary to prepare and analyze the standard samples for each target compound in order to calculate the LOD and the like. For this reason, when the number of kinds of target compounds is increased, work becomes very complicated. Since the condition of the sample analysis apparatus changes with time due to contamination or chronic degradation, it is necessary to periodically check the LOD and the LOQ, but it takes a lot of time and effort if the above complicated work is regularly performed. Sometimes the above work becomes expensive because a standard sample is expensive depending on the kind of the compound.

In the method B, it is necessary to prepare standard samples having different concentrations for each target compound because a calibration curve is required to be prepared for each target compound. For this reason, the problems such as the complicated work and high cost for many kinds of the target compounds are the same as the methods A and C.

The present invention has been made to solve the above problems, and a main object of the present invention is to provide a sample analysis apparatus that can simply obtain the analysis limits such as the LOD and the LOQ for various compounds without performing the complicated and time-consuming analysis on target compounds.

Solution to Problem

A sample analysis apparatus according to a first aspect of the present invention is a sample analysis apparatus configured to analyze various substances contained in a sample, the sample analysis apparatus including:

a) a response factor storage in which response factors are stored for various substances, a response factor being a signal strength ratio of at least one kind of concentration of one of the various substances and a reference substance having an identical or different concentration;

b) an analysis controller configured to control the sample analysis apparatus so as to measure the reference substance to obtain a signal strength value; and c) an analysis limit value estimator configured to estimate one of the signal strength, apt SN ratio and a relative standard deviation during repeated analysis based on the measured signal strength value for the reference substance obtained under the control of the analysis controller and the response factor for a target substance stored in the response factor storage, and calculate an analysis limit value of the target substance using one of the signal strength, the SN ratio and the relative standard deviation.

A sample analysis apparatus according to a second aspect of the present invention is a sample analysis apparatus configured to analyze various substances contained in a sample, the sample analysis apparatus including:

a) a response factor storage in which response factors are stored for various substances, a response factor being a signal strength ratio of at least one kind of concentration of one of the various substances and a reference substance having an identical or different concentration;

b) an analysis controller configured to control the sample analysis apparatus so as to measure the reference substance and a blank sample to obtain signal strength values;

c) a calibration curve preparing unit configured to prepare a calibration curve for a target substance based on the measured signal strength value for the reference substance obtained under the control of the analysis controller d the response factor for the target substance stored in the response factor storage; and d) an analysis limit value estimator configured to calculate an analysis limit value of the target substance using the measured signal strength value for the blank sample obtained under the control of the analysis controller and the calibration curve for the target substance obtained by the calibration curve preparing unit.

A sample analysis apparatus according to a third aspect of the present invention is a sample analysis apparatus configured to analyze various substances contained in a sample, the sample analysis apparatus including:

a) a response factor storage in which response factors are stored for various substances, a response factor being a signal strength ratio of at least one kind of concentration of one of the various substances and a reference substance having an identical or different concentration;

b) a regression equation storage in which a regression equation indicating a relationship between concentration of the reference substance and a relative standard deviation during repeated analysis of the reference substance is stored; and c) an analysis limit value estimator configured to obtain a relative standard deviation during the repeated analysis corresponding to the reference substance having predetermined concentration based on the regression equation stored in the regression equation storage, and estimate an analysis limit value of a target substance by obtaining the relative standard deviation of the target substance at which the relative standard deviation during the repeated analysis of the target substance becomes less than or equal to a predetermined value from the relative standard deviation during the repeated analysis of the reference substance using the response factor stored in the response factor storage.

The sample analysis apparatuses of the first to third aspects of the present invention may be any sample analysis apparatus that can perform quantitative analysis on a substance, compound or element, contained in the sample by any analysis technique. Specifically, for example, the sample analysis apparatuses of the first to third aspects of the present invention may be a mass spectrometer, a gas chromatograph (GC), a liquid chromatograph (LC), a spectrometer, and a fluorescent X-ray analyzer.

Each of the sample analysis apparatuses of the first to third aspects of the present invention includes a response factor storage. As described in Non Patent Literature 5, for example, the response factor is a parameter used to calculate a rough quantitative value semi-quantitative value) in the field of chromatographic analysis and the like. In the sample analysis apparatuses of the first to third aspects of the present invention, a rough analysis limit value of the target substance is calculated using the response factor for the target substance that is a target of the analysis limit value.

In the sample analysis apparatus of the first aspect of the present invention, a reference substance having a predetermined concentration is analyzed a plurality of times under the control of the analysis controller, and measured signal strength values of the plurality of times are acquired for the reference substance. The analysis limit value estimator obtains the relative standard deviation of the reference substance from the plurality of measured signal strength values of the reference substance, and estimates, for example, the relative standard deviation for the target substance that is not measured based on the relative standard deviation and the response factor for the target substance stored in the response factor storage, namely, the signal strength ratio between the target substance and the reference substance. Subsequently, the analysis limit value estimator calculates the analysis limit value of the target substance based on the method A.

The analysis limit value estimator estimates, for example, the SN ratio at a predetermined concentration for the target substance that is not measured based on the plurality of measured signal strength values and the measured noise intensity value for the reference substance and the response factor for the target substance stored in the response factor storage. Subsequently, the analysis limit value of the target substance may be calculated based on the method C.

In the sample analysis apparatus of the second aspect of the present invention, the calibration curve preparing unit prepares the calibration curve by the presumed internal standard method for the target substance based on the measured signal strength value for the reference substance obtained under the control of the analysis controller and the response factor for the target substance stored in the response factor storage. When the measured signal strength value is obtained by measuring the blank sample a plurality of times under the control of the analysis controller, the analysis limit value estimator calculates the analysis limit value of the target substance by the method B using the presumed calibration curve for the target substance.

As described in Non Patent Literature 3, a variance of the residual of the calibration curve can be regarded as a variance of the blank measurement. Thus, the standard deviation of the residual of the calibration curve can be used instead of the standard deviation of the blank signal value. In this case, the analysis limit value estimator can calculate the analysis limit value of the target substance based on the slope of the calibration curve for the target substance obtained by the calibration curve preparing unit and the standard deviation of the residual of the calibration curve calculated from the calibration curve.

In many cases, the blank signal value corresponds to the value of the y-intercept of the calibration curve. Thus, the analysis limit value estimator can calculate the analysis limit value of the target substance based on the slope of the calibration curve for the target substance obtained by the calibration curve preparing unit and the standard deviation of the residual of the y-intercept obtained from the calibration curve.

The measurement of the blank sample is not required in these configurations.

In many cases, for example, a noise level in a region where the reference substance does not exist in measuring the reference substance may be used as the blank signal value. Thus, the analysis limit value estimator may calculate the analysis limit value of the target substance using the measured noise level obtained under the control of the analysis controller and the calibration curve for the target substance obtained by the calibration curve preparing unit. In this case, the noise level may be obtained during the analysis of the reference substance or at a different timing.

On the other hand, in the sample analysis apparatus of the third aspect of the present invention, unlike the sample analysis apparatuses of the first and second aspects, the measurement of the reference substance is not performed, but instead, the regression equation indicating the relationship between the concentration of the reference substance and the relative standard deviation during the repeated analysis is stored in the regression equation storage. The analysis limit value estimatorobtains the relative standard deviation during the repeated analysis corresponding to the reference substance having the predetermined concentration based on the regression equation stored in the regression equation storage. Using the response factor stored in the response factor storage, the analysis limit value of the target substance is estimated by calculating the relative standard deviation of the target substance that becomes less than or equal to a predetermined value from the relative standard deviation of the reference substance during the repeated analysis of the target substance.

As described above, in any one of the sample analysis apparatuses of the first to third aspects of the present invention, the analysis limit such as the LOD and the LOQ for the target substance can be easily obtained without performing the analysis on the target substance a plurality of times.

Preferably in the sample analysis apparatus of the first and second aspects of the present invention, response factors for various substances in combinations of a plurality of substances having known concentrations and a plurality of reference substances having known concentrations are stored in the response factor storage, and the analysis limit value estimator calculates the analysis limit value of the target substance using the response factor in which the reference substance having the known concentration closest to the measured concentration of the reference substance is used, and recalculates the analysis limit value of the target substance using the response factor in which the target substance having the known concentration closest to the analysis limit value and the reference substance having the known concentration closest to the measured concentration of the reference substance are used.

Sometimes the response factors vary largely depending on the combination of the concentration of the reference substance and the concentration of the target substance. However, in the above configuration, the analysis limit value of the target substance is recalculated in the combination closer to the actual concentration, so that accuracy of the analysis limit value can be enhanced as compared with the case where the recalculation is not performed.

The sample analysis apparatus of the first aspect of the present invention may further include a determination notifying unit configured to compare one of the signal strength, an SN ratio, and a relative standard deviation during the repeated analysis for the target substance in calculating the analysis limit value using the analysis limit value estimator to a predetermined threshold, determine whether one of these values is greater than or equal to a first threshold or less than or equal to a second threshold, and notify the determination result.

The first threshold and the second threshold may appropriately be set in advance by a manufacturer of the sample analysis apparatus. Specifically, it is desirable that the threshold is experimentally checked and set such that the accuracy of the estimation using the response factor from the measured signal strength value of the reference substance to the signal strength value of the target substance does not satisfy the generally-required accuracy, namely, such that an error becomes too large. With this configuration, the determination notifying unit accurately notifies the user that the analysis limit value cannot be obtained with sufficient accuracy by the function of simply calculating the analysis limit value installed in the sample analysis apparatus of the present invention.

In the sample analysis apparatus of the first to third aspects of the present invention, the analysis limit value estimator may calculate a fluctuation width of the analysis limit value corresponding to a deviation width of the previously-set response factor.

The deviation width of the response factor may appropriately be set by the user.

There is a possibility that a deviation between the response factor stored in the response factor storage and the actual response factor due to an apparatus difference between the sample analysis apparatuses or a difference in state of the sample analysis apparatus (for example, difference in installation environment). However, in the above configuration, the user can be notified of the fluctuation range of the analysis limit value reflecting the deviation of the response factor. Consequently, the user can more accurately grasp the situation of the analysis limit value in the actual sample analysis apparatus.

Advantageous Effects of Invention

The sample analysis apparatus of the present invention can simply calculate analysis limits such as the LOD and the LOQ for various target compounds without performing actual analysis for the target compounds, and provide the analysis limits to the user.

DESCRIPTION OF EMBODIMENTS

First Embodiment

Hereinafter, a gas chromatograph mass spectrometer (GC-MS) that is an embodiment of a sample analysis apparatus according to the present invention will be described in detail with reference to the accompanying drawings.

Figure 1:
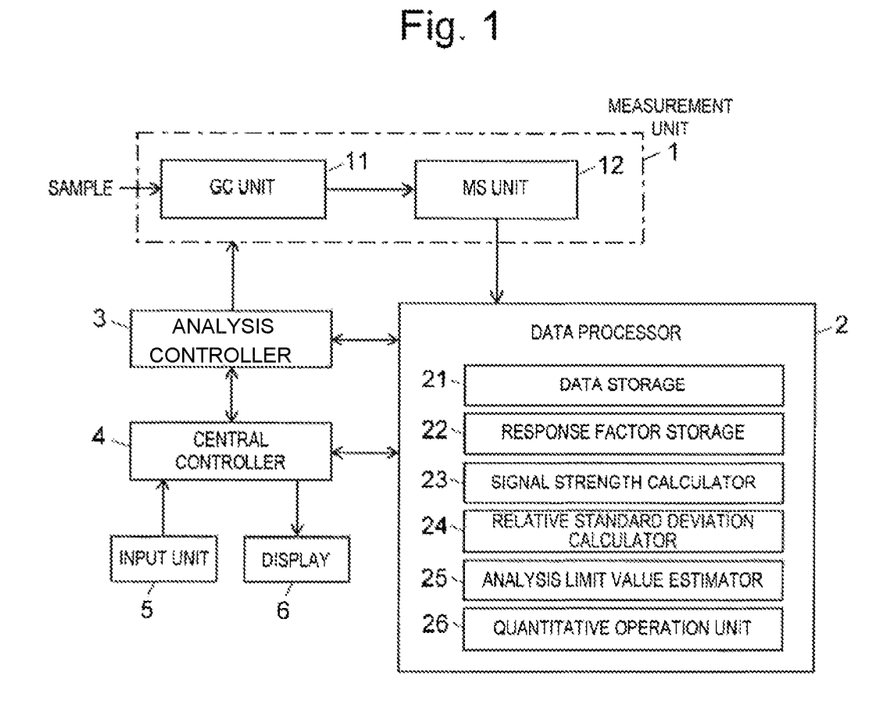
FIG. 1 is a block diagram illustrating a main part of a GC-MS according to a first embodiment of the present invention.

FIG. 1 is a block diagram illustrating a main part of a GC-MS according to a first embodiment.

As illustrated in FIG. 1, the GC-MS of the first embodiment includes a measurement unit 1, a data processor 2, an analysis controller 3, a central controller 4, an input unit 5, and a display 6.

The measurement unit 1 includes a gas chromatograph (GC) unit 11 and a mass spectrometry (MS) unit 12. Although not illustrated, the GC unit 11 includes a column that temporally separates a compound contained in a sample, a sample vaporization chamber provided at an inlet end of the column, the sample vaporization chamber vaporizing a liquid sample and sending the vaporized sample on a carrier gas to the column, an injector that introduces a predetermined amount of liquid sample into the sample vaporization chamber, and a column oven that regulates a temperature of the column. On the other hand, the MS unit 12 includes an ionizer that ionizes the compound contained in the sample gas passing through the column of the GC unit 11, a mass separator such as a quadrupole mass that separates the generated ions according to a mass-to-charge ratio m/z, and an ion detector that detects ions separated according to the mass-to-charge ratio. A detection signal obtained by the ion detector of the MS unit 12 is input to the data processor 2.

The data processor 2 includes a data storage 21 that digitizes and stores input detection data, a response factor storage 22, a signal strength calculator 23, a relative standard deviation calculator 24, an analysis limit value estimator 25, and quantitative operation unit 26 as functional blocks. The analysis controller 3 mainly has a function of controlling operation of the GC-MS analysis in the measurement unit 1. The central controller 4 has a function of integrally controlling the operation of the measurement unit 1 and processing operation of the data processor 2 through the analysis controller 3. The input unit 5 and the display 6 are a user interface.

At least part of the function of the analysis controller 3, the data processor 2, and the central controller 4 can be constructed with a general-purpose personal computer. The function of each functional block can be implemented by executing dedicated control and processing software installed in the personal computer.

The operation during quantitative analysis in the GC-MS of the first embodiment will schematically be described.

In the measurement unit 1, the GC unit 11 separates various compounds contained in the sample in a temporal direction, and sends a sample gas containing the separated compounds to the MS unit 12. When performing quantitation on a specific or a plurality of compounds, the MS unit 12 is controlled so as to perform selected ion monitoring (SIM) measurement that selectively detects ions having the mass-to-charge ratio associated with the target compound. Data obtained by the GC-MS analysis is stored in the data storage 21. The quantitative operation unit 26 prepares a mass chromatogram (extracted ion chromatogram) corresponding to the compound that is a quantitation target using the data. stored in the data storage 21, detects a peak on the mass chromatogram to obtain a peak area, and calculates a concentration by referring to a previously-prepared calibration curve.

Figure 3A:
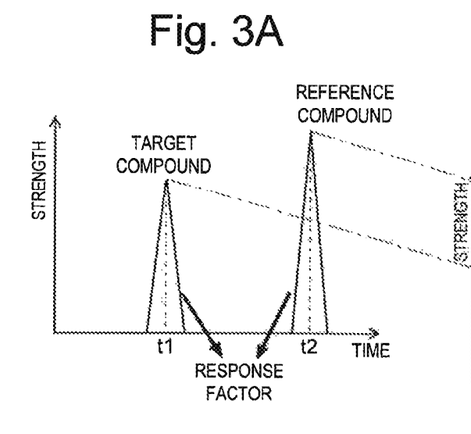
FIGS. 3A-3B are a conceptual view illustrating a response factor.
Figure 3B:
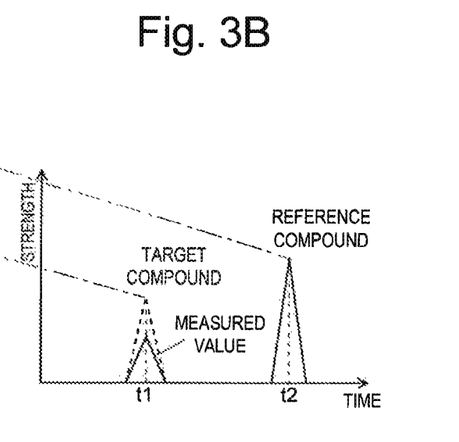

In the GC-MS of the first embodiment, the response factor storage 22 is a kind of database in which a response factor that is a ratio of the signal strength of a compound having a certain concentration and a reference compound having a certain concentration is stored while associated with pieces of information such as a name of each compound, a molecular formula, a mass-to-charge ratio value and concentration with respect to various compounds. FIGS. 3A-3B are a conceptual view illustrating the response factor, and is a total ion chromatogram (TIC) prepared by the GC-MS analysis or a chromatogram obtained by synthesizing the extracted ion chromatograms corresponding to the compounds.

As illustrated in FIG. 3A, when the peak of the target compound of a predetermined concentration C1 is observed at a retention time t1 while the peak of a reference compound of a predetermined concentration C2 is observed at a retention time t2, an area value of each peak is defined as a signal strength value, and a signal strength ratio is defined as the response factor of the target compound. It is assumed that a chromatogram in FIG. 3B is obtained as a result of the GC-MS analysis of another sample containing the target compound having an unknown concentration and the reference compound having the predetermined concentration C2. At this point, although the signal strength value of the reference compound is not necessarily identical to that in FIG. 3A due to a difference in detection sensitivity of the apparatus and the like, the response factor can be considered to be identical, so that the peak of the target compound having the concentration C1 should be indicated by a dotted line obtained from the response factor. Consequently, an unknown concentration of the target compound can be estimated from the concentration C1 using a ratio of the area value of the peak indicated by the dotted line and the area value of the actual measurement of the peak at the retention time t1. in this way, conventionally, the response factor is generally used for rough quantitation (semi-quantitation).

The response factor of certain one kind of the target compound may be only one for a combination of one kind of concentration of the target compound and one kind of concentration of the reference compound, but preferably response factors for different combinations of a plurality of concentrations of the target compound and the reference compound may be stored in the response factor storage 22. This is because the target compound is not necessarily similar to the reference compound in a relationship between the concentration and the signal strength value.

In the quantitative analysis as described above, it is necessary to grasp analysis limit values such as the LOD and the LOQ of the apparatus. In the GC-MS of the first embodiment, the analysis limit value of the target compound can be estimated and provided to an operator according to the following procedure using the response factor stored in the response factor storage 22.

Figure 2:
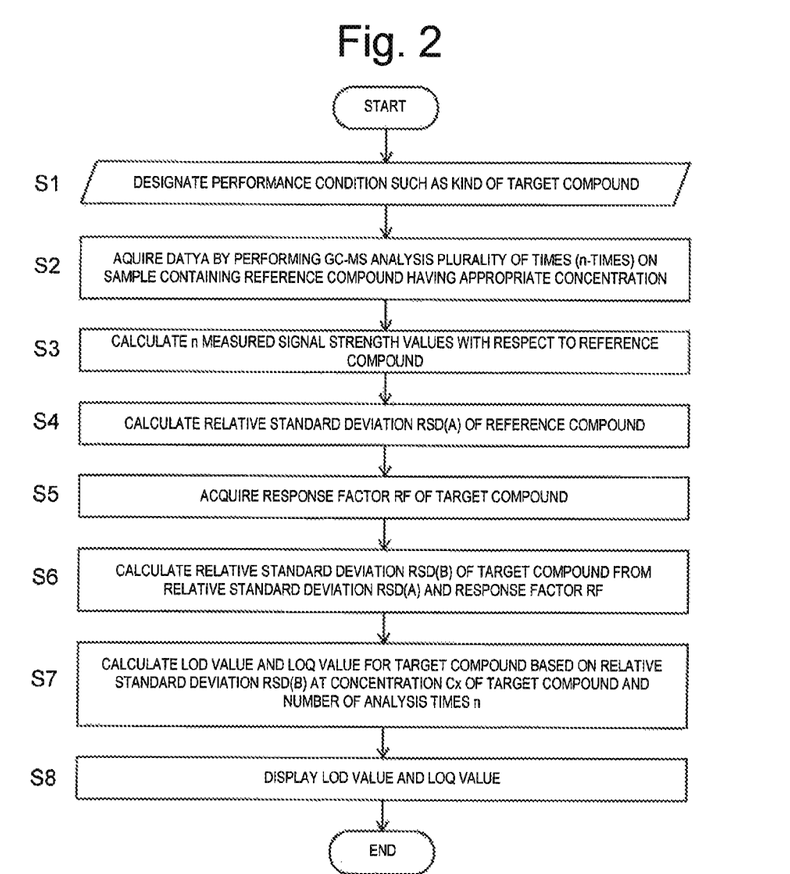
FIG. 2 is a flowchart illustrating an example of analysis limit value estimation processing in the GC-MS of the first embodiment.

FIG. 2 is a flowchart illustrating an example of analysis limit value estimation processing in the GC-MS of the first embodiment.

The operator instructs the performance of the automatic calculation of the analysis limit value after inputting, from the input unit 5, performance conditions such as the kind of the target compound in which the analysis limit value should be known and the kind and the concentration of the reference compound to be measured (step S1).

The central controller 4 having received the instruction controls the analysis controller 3 such that the measurement unit 1 performs the GC-MS analysis on the sample containing the reference compound having a previously-prepared appropriate concentration Cx a plurality of times (n times). Under the control of the analysis controller 3, the measurement unit 1 repeatedly performs the GC-MS analysis on the same sample n times. In each GC-MS analysis, the MS unit 12 repeatedly performs SIM measurement for the mass-to-charge ratio associated with the reference compound, collects data for preparing the mass chromatogram, and stores the data in the data storage 21 (step S2).

The signal strength calculator 23 prepares the mass chromatograms from the data obtained each time the GC-MS analysis is performed, and calculates the area value of the peak observed at the retention times corresponding to the reference compound in the mass chromatograms as the measured signal strength value. From the results of the n-time GC-MS analysis, n measured signal strength values are obtained (step S3).

Subsequently, the relative standard deviation calculator 24 obtains an average value and a standard deviation from the n measured signal strength values of the reference compound obtained in step S3, and calculates a relative standard deviation RSD(A) of the reference compound from these values (step S4).

It is assumed that Aa is the signal strength value when the concentration of the reference compound is Ca, and that Ab is the signal strength value when the concentration of the target compound is Ch. At this point, a response factor RF of the target compound is given by the following equation (5).

$$RF=(Ab/Cb)/(Aa/Ca) \qquad (5)$$

Generally, it is known by statistical calculation that, in a mass spectrometer, the relative standard deviation is a multiple of $\sqrt{x}$ when the number of ions to be measured becomes $1/x$ (see Non Patent Literature 6). For this reason, a relative standard deviation RSD(B) of the target compound having the concentration Cx is given by the following equation (6).

$$RSD(B)=RSD(A)/\sqrt{RF} \qquad (6)$$

The relative standard deviation calculator 24 reads the response factor of the target compound from the response factor storage 22 (step S5). It is preferable when the response factor of the target compound to the reference compound having the concentration Cx exists, otherwise, the response factor of the target compound to the reference compound having the concentration closest to the concentration Cx may be read. Based on the equation (6), the relative standard deviation RSD(B) of the target compound is calculated from the relative standard deviation RSD(A) of the reference compound (step S6).

After the relative standard deviation RSD(B) of the target compound is determined as described above, the analysis limit value estimator 5 calculates the LOD value and the LOQ value as follows.

Assuming that RSD(B) is the relative standard deviation of the target compound at a concentration Cx from the equation (5), the following equation (7) calculating the detection limit value LOD(B) for the target compound is given from the equation (1).

$$LOD(B)=(RSD(B)/100) \times Cx \times t(n-1,\alpha)=\{(RSD(A)\sqrt{RF})/100\} \times Cx \times t(n-1\alpha) \qquad (7)$$

On the other hand, the following equation (8) calculating a quantitation limit value LOQ(B) for the target compound is given from equation (2).

$$LOQ(B)=\beta \times LOD(B) \qquad (8)$$

The detection limit value LOD(B) and the quantitation limit value LOQ(B) of the target compound are calculated using the equations (7), (8) (step S7). This is a method in which the method A is used.

When the detection limit value and the quantitation limit value of the target compound are obtained as described above, the analysis limit value estimator 25 displays the results of the detection limit value and the quantitation limit value on the screen of the display 6 through the central controller 4 in a predetermined format (step S8). Consequently, the operator can know the approximate values of the detection limit value and the quantitation limit value of the target compound without preparing a standard product of the target compound or the like.

Modification of First Embodiment

In the GC-MS of the first embodiment, the signal strength measured value and a noise intensity value are obtained for the reference compound in step S3, the SN ratio is calculated instead of the relative standard deviation, and the detection limit value and the quantitation limit value may be calculated using the SN ratio.

It is assumed that Aa is the measured signal strength value when the concentration of the reference compound is Ca, and that Na is the noise intensity value. Assuming that the GC-MS analysis is performed on the target compound, a noise intensity Nb is estimated as follows based on the measurement result of the sample containing the reference compound (or the measurement result of a blank sample measured separately). The signal strength value Ab of the target compound having a concentration Cb is given from the equation (5).

$$Ab = RF \times (Aa/Ca) \times Cb \quad (9)$$

Thus, an SN ratio S/N(B) of the target compound is given by the following equation (10). That is, the SN ratio S/N(B) can be calculated using the response factor RF of the target compound.

$$S/N(B) = Ab/Nb = \{RF \times (Aa/Ca) \times Cb\}/Nb \quad (10)$$

When the lowest concentration at which the SN ratio S/N(B) for the target compound is greater than or equal to an appropriate threshold Y is the detection limit value of the target compound, the detection limit value LOD(B) is given by the following equation (11) from the equation (10).

$$S/N(B) = \{RF \times (Aa/Ca) \times Cb\}/Nb \geq Y$$

$$Cb \geq Y \times Nb/\{RF \times (Aa/Ca)\} = LOD(B) \quad (11)$$

Consequently, the detection limit value LOD(B) of the target compound can be estimated, and the quantitation limit value may be calculated from the equation (2).

Alternatively, after the relative standard deviation RSD (B) is calculated for the target compound as described above, the lowest concentration at which the relative standard deviation RSD(B) becomes less than or equal to an appropriate threshold X may be set to the detection limit value LOD(B) of the target compound. That is, the lowest concentration satisfying the following equation (12) is obtained as the detection limit value LOD(B) from the equation (6).

$$RSD(A)/\sqrt{RF} \leq X \quad (12)$$

This is an application of the method C.

Second Embodiment

Figure 4:
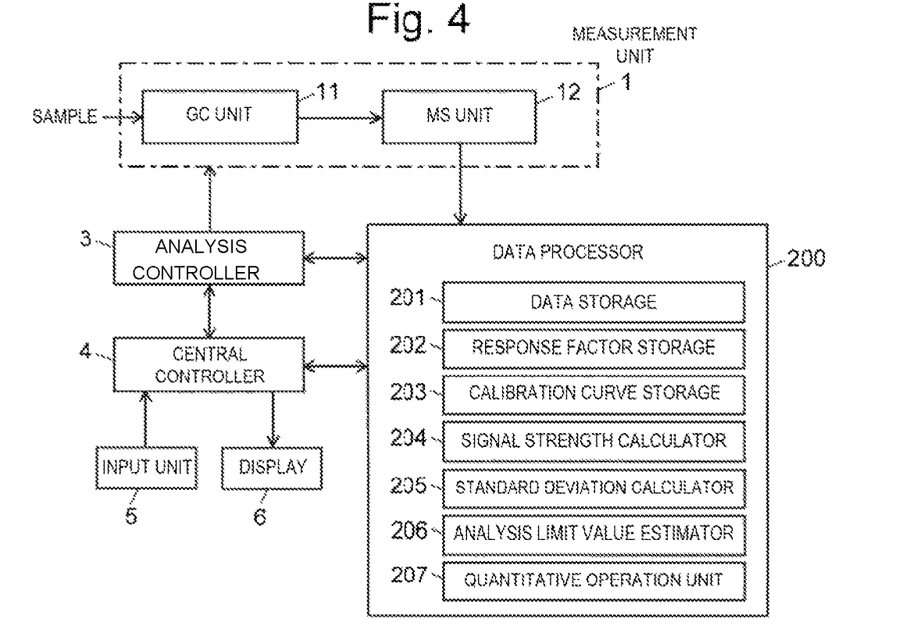
FIG. 4 is a block diagram illustrating a main part of a GC-MS according to a second embodiment of the present invention.

FIG. 4 is a block diagram illustrating a main part of GC-MS according to a second embodiment of the sample analysis apparatus of the present invention. Because the configurations except for an internal configuration of a data processor 200 are identical to those of the GC-MS of the first embodiment, the description will be omitted.

In the GC-MS of the second embodiment, the data processor 200 includes a data storage 201, a response factor storage 202, a calibration curve storage 203, a signal strength calculator 204, a standard deviation calculator 205, an analysis limit value estimator 206, and a quantitative operation unit 207 as functional blocks. The data storage 201, the response factor storage 202, and the quantitative operation unit 207 are completely identical to the data storage 21, the response factor storage 22, and the quantitative operation unit 26 in the GC-MS of the first embodiment.

In the GC-MS of the second embodiment, the calibration curve relational expression or a table indicating a relationship between the concentration and the signal strength value) is previously prepared by an internal standard method of various target compounds using the reference compound as an internal standard or an external standard, and the calibration curve is stored in the calibration curve storage 203 while associated with information such as the kind of the target compound. The calibration curve is used for general quantitation, and is not special.

When the operator inputs the performance conditions such as the kind of target compound from the input unit 5 and instructs the performance of automatic calculation of the analysis limit value, the measurement unit 1 performs the GC-MS analysis on the sample containing the reference compound or the blank sample under the control of the analysis controller 3. Which one of the samples is used may be designated as the performance condition. When the blank sample is used, the GC-MS analysis is performed a plurality of times, and the signal strength values at the retention time corresponding to the target compound is repeatedly acquired.

When the blank sample is used as the sample, the signal strength calculator 204 calculates an average value from the plurality of signal strength values at the concentration of zero of the target compound obtained by the measurement of the blank sample, and sets the average value to a signal strength value $S_0$ at the concentration of zero. The standard deviation calculator 205 calculates a standard deviation from a plurality of signal strength values at the concentration of zero of the target compound obtained by the measurement of the blank sample, and sets the standard deviation to a standard deviation $S_b$ at the concentration of zero of the target compound. In this way, the signal strength value $S_0$ and the standard deviation $S_b$ at the concentration of zero are acquired.

On the other hand, when the sample containing the reference compound is used as the sample, the signal strength calculator 204 obtains the signal strength value $S_0$ at the concentration of zero of the target compound based on the measured signal strength value for the reference compound that is any concentration, the response factor of the target compound stored in the response factor storage 202, and the calibration curve of the target compound stored in the calibration curve storage 203. The standard deviation calculator 205 obtains the standard deviation $S_b$ at the concentration of zero of the target compound based on the measured signal strength value for the reference compound that is any concentration, the response factor of the target compound stored in the response factor storage 202, and the calibration curve of the target compound stored in the calibration curve storage 203.

Assuming that a is a slope of the calibration curve of the target compound, the following equations (13), (14) are given from the equations (3), (4).

$$LOD(B)=(S_0+S_b \times \gamma)/a \qquad (13)$$

$$LOQ(B)=(S_0+S_b \times \delta)/a \qquad (14)$$

As described above, both $\gamma$ and $\delta$ are coefficients, and typically $\gamma$ ranges from about 3 to about 3.3 and $\delta$ is about 10. For this reason, the analysis limit value estimator 206 applies the standard deviation $S_b$ at the concentration of zero of the target compound and the signal strength value $S_0$ at the concentration of zero of the target compound to the equations (13), (14) to estimate the detection limit value LOD(B) and the quantitation limit value LOQ(B).

This is a method in which the method B is used.

Similarly to the method B, the detection limit value LOD(B) and the quantitation limit value LOQ(B) can be estimated using a standard deviation of a residual of the calibration curve obtained based on the calibration curve of the target compound instead of the standard deviation at the concentration of zero obtained by the measurement of the blank sample. Because the signal value of the concentration of zero is a y-intercept of the calibration curve, when the calibration curve is a straight line, the detection limit value LOD(B) and the quantitation limit value LOQ(B) can also be estimated using the standard deviation of the y-intercept of the calibration curve and the slope of the calibration curve. In these methods, the measurement of the blank sample is not required. The detection limit value LOD(B) and the quantitation limit value LOD(B) can be estimated using a noise level observed in a time domain where the target compound and other substances are presumed not to exist as the signal value of the concentration of zero.

Third Embodiment

Figure 5:
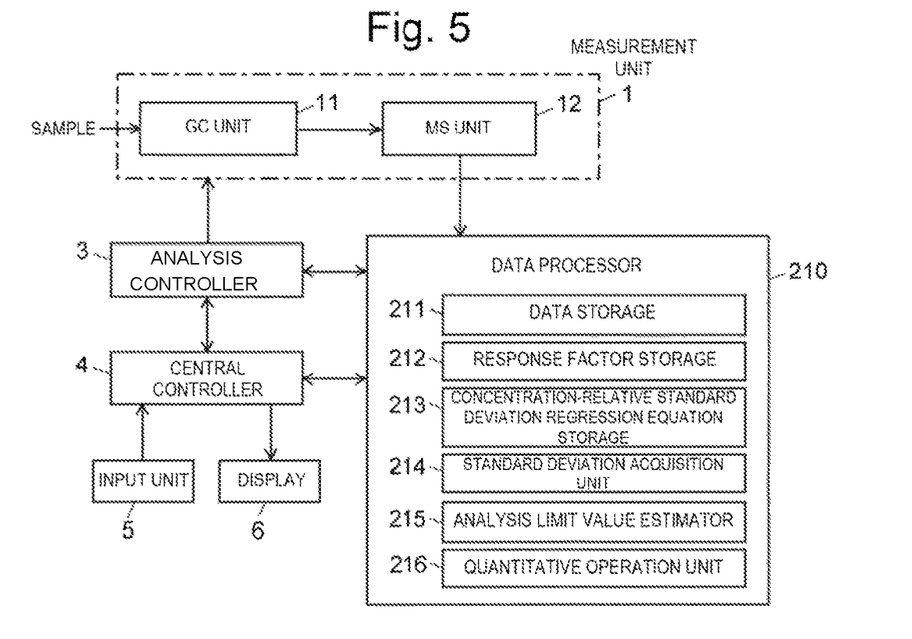
FIG. 5 is a block diagram illustrating a main part of a GC-MS according to a third embodiment of the present invention.

FIG. 5 is a block diagram of a main part of a GC-MS according to a third embodiment of the sample analysis apparatus of the present invention. Because the configurations except for an internal configuration of a data processor 210 are identical to those of the GC-MS of the first embodiment, the description will be omitted.

In the GC-MS of the third embodiment, the data processor 210 includes a data storage 211, a response factor storage 212, a concentration-relative standard deviation regression equation storage 213, a standard deviation acquisition unit 214, an analysis limit value estimator 215, and a quantitative operation unit 216 as functional blocks. The data storage 211, the response factor storage 212, and the quantitative operation unit 216 are identical to the data storage 21, the response factor storage 22, and the quantitative operation unit 26 in the GC-MS of the first embodiment.

Figure 6:
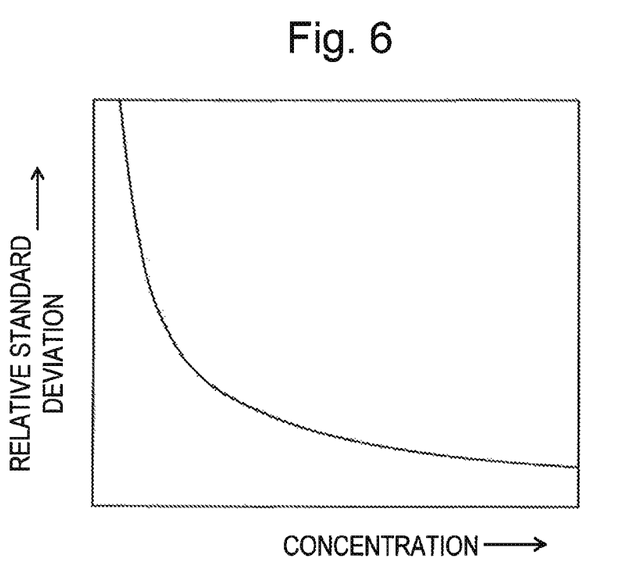
FIG. 6 is a view illustrating an example of a relationship between concentration and relative standard deviation.

In the GC-MS of the third embodiment, a regression equation RSD(A)=f(Ca) is previously prepared from a relationship between the concentration Ca of the reference compound and the relative standard deviation RSD(A) of the reference compound, and the information representing the regression equation is stored in the concentration-relative standard deviation regression equation storage 213. FIG. 6 is a view illustrating an example of the regression equation.

When the operator designates the concentration of the reference compound as one of the performance conditions, the standard deviation acquisition unit 214 obtains the relative standard deviation of the reference compound corresponding to the concentration based on the regression equation stored in the concentration-relative standard deviation regression equation storage 213. Using the relative standard deviation of the reference compound and the response factor of the target compound obtained from the response factor storage 212, the LOD and the LOQ of the target compound are estimated by, for example, the method described in the modification of the first embodiment.

In the GC-MS of the third embodiment, unlike the first and second embodiments, using only the already obtained information, namely, only the regression equation and the response factor, the analysis limit value can be calculated without actually measuring the sample containing the reference compound and the blank sample.

In the GC-MS of each of the above embodiments, when the response factor stored in the response factor storage corresponds to only one combination of the concentrations of the reference compound and the target compound, the processing may be performed while the response factor is assumed to be constant in the whole concentration range.

The GC-MS of the first and second embodiments may have a function of searching and optimizing the response factor of the condition closest to the combination of the concentration value of the reference compound used to estimate the LOD described above and the concentration value of the target compound close to the estimated analysis limit value among the response factors for the combinations of at least one kind of concentrations of the reference compound and at least one kind of concentrations of the target compound stored in the response factor storage. That is, a quantitation limit value can be obtained with high accuracy when the quantitation limit value is finally obtained using the response factor corresponding to the concentration that is estimated to be closest to the actual concentration of the target compound.

The estimation processing is performed under the assumption that the SN ratio and relative standard deviation of the target compound can be estimated from the analysis result of the sample containing the reference compound, and usually there is no problem in this assumption itself. However, for example, when the signal strength of the target compound at the LOD or the LOQ calculated in consideration of the response factor is extremely small, there is a possibility that the above assumption cannot be applied. For this reason, when the signal strength value at the estimated LOD or LOQ is less than or equal to a predetermined threshold (or greater equal to the predetermined threshold), a warning may be issued to give attention for the operator.

Although the response factor is usually decided by an apparatus manufacturer and stored in the response factor storage, sometimes a non-negligible deviation is generated between the response factor stored in the response factor storage and the measured response factor due to an instrumental error of the apparatus or a temporal change of the apparatus. For this reason, the operator appropriately specifies a deviation width of the response factor from the input unit 5, estimates the range of the LOD the LOQ according to the deviation width, and indicates the range by an error bar in displaying the range. This allows the operator to know a width of the estimated analysis limit value.

The above embodiments are merely examples of the present invention, and it is clear that, even if appropriate changes, corrections, and additions are made within the scope of the present invention with respect to points other than the above description, the changes, corrections, and additions are included in the scope of the present invention. For example, in the above embodiments, the sample analysis apparatus of the present invention is applied to the GC-MS. However, it is apparent that the sample analysis apparatus of the present invention can be applied to various analysis apparatuses other than the GC-MS.

REFERENCE SIGNS LIST

1 . . . Measurement Unit
11 . . . Liquid Chromatograph (LC) Unit

12 ... Mass Spectrometry (MS) Unit
2, 200, 210 ... Data Processor
21, 201, 211 ... Data Storage
22, 202, 212 ... Response Factor Storage
23, 204 ... Signal Strength Calculator
24 ... Relative Standard Deviation Calculator
25, 206, 215 ... Analysis Limit Value Estimator
26, 207, 216 ... Quantitative Operation Unit
203 ... Calibration Curve Storage
205 ... Standard Deviation Calculator
213 ... Concentration-Relative Standard Deviation Regression Equation Storage
214 ... Standard Deviation Acquisition Unit
3 ... Analysis Controller
4 ... Central Controller
5 ... Input Unit
6 ... Display

The invention claimed is:

1. A sample analysis apparatus configured to analyze various substances contained in a sample, the sample analysis apparatus comprising:
a processor that comprises a response factor storage in which response factors are stored for various substances, a response factor being a signal strength ratio of at least one kind of concentration of one of the various substances and a reference substance having an identical or different concentration; and
an analysis controller configured to control the sample analysis apparatus so as to measure the reference substance to obtain a signal strength value;
wherein the processor is configured to:
estimate one of the signal strength, an SN ratio, and a relative standard deviation during repeated analysis based on the measured signal strength value for the reference substance obtained under the control of the analysis controller and the response factor for a target substance stored in the response factor storage; and
calculate an analysis limit value of the target substance using one of the signal strength, the SN ratio, and the relative standard deviation.

2. The sample analysis apparatus according to claim 1,
wherein response factors for various substances in combinations of a plurality of substances having known concentrations and a plurality of reference substances having known concentrations are stored in the response factor storage, and
wherein the processor is further configured to:
calculate the analysis limit value of the target substance using the response factor in which the reference substance having the known concentration closest to the measured concentration of the reference substance is used; and
recalculate the analysis limit value of the target substance using the response factor in which the target substance having the known concentration closest to the analysis limit value and the reference substance having the known concentration closest to the measured concentration of the reference substance are used.

3. The sample analysis apparatus according to claim 1,
wherein the processor is further configured to:
compare one of the signal strength, an SN ratio, and a relative standard deviation during the repeated analysis for the target substance in calculating the analysis limit value using the analysis limit value estimator to a predetermined threshold;
determine whether one of these values is greater than or equal to the predetermined threshold or less than or equal to the predetermined threshold; and
notify a determination result.

4. The sample analyzer according to claim 1, wherein the processor is further configured to calculate a fluctuation width of the analysis limit value based on a deviation width of the response factor of the target substance input by an operator.

5. A sample analysis apparatus configured to analyze various substances contained in a sample, the sample analysis apparatus comprising:
a processor that comprises a response factor storage in which response factors are stored for various substances, a response factor being a signal strength ratio of at least one kind of concentration of one of the various substances and a reference substance having an identical or different concentration; and
an analysis controller configured to control the sample analysis apparatus so as to measure the reference substance and a blank sample to obtain signal strength values;
wherein the processor is configured to:
prepare a calibration curve for a target substance based on the measured signal strength value for the reference substance obtained under the control of the analysis controller and the response factor for the target substance stored in the response factor storage; and
calculate an analysis limit value of the target substance using the measured signal strength value for the blank sample obtained under the control of the analysis controller and the calibration curve for the target substance obtained by the processor.

6. The sample analysis apparatus according to claim 5,
wherein response factors for various substances in combinations of a plurality of substances having known concentrations and a plurality of reference substances having known concentrations are stored in the response factor storage, and
wherein the processor is further configured to:
calculates the analysis limit value of the target substance using the response factor in which the reference substance having the known concentration closest to the measured concentration of the reference substance is used; and
recalculates the analysis limit value of the target substance using the response factor in which the target substance having the known concentration closest to the analysis limit value and the reference substance having the known concentration closest to the measured concentration of the reference substance are used.

7. The sample analyzer according to claim 5, wherein the processor is further configured to calculate a fluctuation width of the analysis limit value based on a deviation width of the response factor of the target substance input by an operator.

8. A sample analysis apparatus configured to analyze various substances contained in a sample, the sample analysis apparatus comprising:
a processor that comprises a response factor storage in which response factors are stored for various substances, a response factor being a signal strength ratio of at least one kind of concentration of one of the various substances and a reference substance having an identical or different concentration; and an analysis controller configured to control the sample analysis apparatus so as to measure the reference substance to obtain a signal strength value;

wherein the processor is configured to:

prepare a calibration curve for a target substance based on the measured signal strength value for the reference substance obtained under the control of the analysis controller and the response factor for the target substance stored in the response factor storage; and calculate an analysis limit value of the target substance based on a slope of the calibration curve for the target substance obtained by the processor and a standard deviation of a residual of the calibration curve calculated from the calibration curve.

9. The sample analysis apparatus according to claim 8, wherein response factors for various substances in combinations of a plurality of substances having known concentrations and a plurality of reference substances having known concentrations are stored in the response factor storage, and wherein the processor is further configured to:

calculate the analysis limit value of the target substance using the response factor in which the reference substance having the known concentration closest to the measured concentration of the reference substance is used; and recalculates the analysis limit value of the target substance using the response factor in which the target substance having the known concentration closest to the analysis limit value and the reference substance having the known concentration closest to the measured concentration of the reference substance are used.

10. The sample analyzer according to claim 8, wherein the processor is further configured to calculate a fluctuation width of the analysis limit value based on a deviation width of the response factor of the target substance input by an operator.

11. A sample analysis apparatus configured to analyze various substances contained in a sample, the sample analysis apparatus comprising:

a processor that comprises a response factor storage in which response factors are stored for various substances, a response factor being a signal strength ratio of at least one kind of concentration of one of the various substances and a reference substance having an identical or different concentration; and an analysis controller configured to control the sample analysis apparatus so as to measure the reference substance to obtain a signal strength value;

wherein the processor is configured to:

prepare a calibration curve for a target substance based on the measured signal strength value for the reference substance obtained under the control of the analysis controller and the response factor for the target substance stored in the response factor storage; and calculate an analysis limit value of the target substance based on a slope of the calibration curve for the target substance obtained by the processor and a standard deviation of a residual of a y-intercept obtained from the calibration curve.

12. The sample analysis apparatus according to claim 11, wherein response factors for various substances in combinations of a plurality of substances having known concentrations and a plurality of reference substances having known concentrations are stored in the response factor storage, and wherein the processor is further configured to:

calculates the analysis limit value of the target substance using the response factor in which the reference substance having the known concentration closest to the measured concentration of the reference substance is used; and recalculates the analysis limit value of the target substance using the response factor in which the target substance having the known concentration closest to the analysis limit value and the reference substance having the known concentration closest to the measured concentration of the reference substance are used.

13. The sample analyzer according to claim 11, wherein the processor is further configured to calculate a fluctuation width of the analysis limit value based on a deviation width of the response factor of the target substance input by an operator.

14. A sample analysis apparatus configured to analyze various substances contained in a sample, the sample analysis apparatus comprising:

a processor that comprises a response factor storage in which response factors are stored for various substances, a response factor being a signal strength ratio of at least one kind of concentration of one of the various substances and a reference substance having an identical or different concentration; and an analysis controller configured to:

control the sample analysis apparatus so as to measure the reference substance to obtain a signal strength value; and control the sample analysis apparatus to obtain a noise level of the sample analysis apparatus during the analysis of the reference substance or at a timing different from the analysis of the reference substance;

wherein the processor is configured to:

prepare a calibration curve for a target substance based on the measured signal strength value for the reference substance obtained under the control of the analysis controller and the response factor for the target substance stored in the response factor storage; and calculate an analysis limit value of the target substance using the measured noise level obtained under the control of the analysis controller and the calibration curve for the target substance obtained by the processor.

15. The sample analysis apparatus according to claim 14, wherein response factors for various substances in combinations of a plurality of substances having known concentrations and a plurality of reference substances having known concentrations are stored in the response factor storage, and wherein the processor is further configured to:

calculates the analysis limit value of the target substance using the response factor in which the reference substance having the known concentration closest to the measured concentration of the reference substance is used; and recalculates the analysis limit value of the target substance using the response factor in which the target substance having the known concentration closest to the analysis limit value and the reference substance having the known concentration closest to the measured concentration of the reference substance are used.

16. The sample analyzer according to claim 14, wherein the processor is further configured to calculate a fluctuation width of the analysis limit value based on a deviation width of the response factor of the target substance input by an operator.

17. A sample analysis apparatus configured to analyze various substances contained in a sample, the sample analysis apparatus comprising:
a processor comprising:
a response factor storage in which response factors are stored for various substances, a response factor being a signal strength ratio of at least one kind of concentration of the substance and a reference substance having an identical or different concentration; and
a regression equation storage in which a regression equation indicating a relationship between concentration of the reference substance and a relative standard deviation during repeated analysis of the reference substance is stored;
wherein the processor is configured to:
obtain a relative standard deviation during the repeated analysis corresponding to the reference substance having predetermined concentration based on the regression equation stored in the regression equation storage; and
estimate an analysis limit value of a target substance by obtaining the relative standard deviation of the target substance at which the relative standard deviation during the repeated analysis of the target substance becomes less than or equal to a predetermined value from the relative standard deviation during the repeated analysis of the reference substance using the response factor stored in the response factor storage.

18. The sample analyzer according to claim 17, wherein the processor is further configured to calculate a fluctuation width of the analysis limit value based on a deviation width of the response factor of the target substance input by an operator.

* * * * *